United States Patent [19]

Wurster

[11] Patent Number: 4,714,986
[45] Date of Patent: Dec. 22, 1987

[54] VEHICULAR REFLECTOR-LIGHT SOURCE COMBINATION UNIT

[75] Inventor: Ewald Wurster, Grünwald, Fed. Rep. of Germany

[73] Assignee: Patent Treuhand Gesellschaft fur elektrische Gluhlampen mbH, Munich, Fed. Rep. of Germany

[21] Appl. No.: 863,962

[22] Filed: May 16, 1986

[30] Foreign Application Priority Data

May 31, 1985 [DE] Fed. Rep. of Germany ....... 3519611

[51] Int. Cl.$^4$ ............................................. P21V 29/08
[52] U.S. Cl. ..................................... 362/267; 362/263; 362/82
[58] Field of Search ............... 362/267, 263, 260, 261, 362/265, 61, 62, 82, 83

[56] References Cited

U.S. PATENT DOCUMENTS 3,551,667 12/1970 Husby .................................. 362/263
4,403,277 9/1983 Eargle et al. ........................ 362/263
4,414,615 11/1983 Szcker et al. ........................ 362/263
4,455,595 6/1984 Engel et al. ......................... 362/263
4,569,007 2/1986 Dick ..................................... 362/82

Primary Examiner—Raymond A. Nelli
Attorney, Agent, or Firm—Frishauf, Holtz, Goodman & Woodward

[57] ABSTRACT

To eliminate external high-voltage, for example 25 kV insulated-electrical cables connected to a high-pressure discharge lamp in the reflector—light source—supply circuit combination unit, a plastic housing is fitted against the back surface of the reflector, thus taking up space which is usually available and not otherwise utilized within an automotive vehicle, the housing retaining electrical supply and starting circuitry, including a high-voltage source; the lamp (4, 13) is directly connected to the housing which is sealed by a flexible seal to the reflector, to thereby exclude environmental contamination of the interior of the reflector.

19 Claims, 4 Drawing Figures

VEHICULAR REFLECTOR-LIGHT SOURCE COMBINATION UNIT

The present invention relates to a vehicular, and more particularly automotive-type combination reflector light source and supply circuit unit, and more particularly to an automotive-type headlight utilizing a high-pressure discharge lamp as the light source.

BACKGROUND

High-pressure discharge lamps are used in combination with reflectors for various purposes. High-pressure discharge lamps have the substantial advantage that their light output per watt input, that is, their luminous conversion efficiency is substantially higher than that of incandescent lamps. Typically, the reflector is closed off at its light emitting end by a glass or similar lens or light directing element. High-pressure discharge lamps require an auxiliary circuit unit in order to operate such lamps efficiently and under the severe conditions of automotive use. The lamp must ignite to provide light regardless of the prior ignition or light emitting history; in other words, the lamp must ignite promptly upon being connected to an electrical power source regardless of ambient temperature conditions - subfreezing cold or high outside temperatures-and regardless of whether the lamp has just been operated for an extended period of time, extinguished, and should be re-ignited, so that the internal components of the lamp are still hot. Ignition of the lamp, thus, must be reliably insured at any time. Electronic auxiliary circuits have been particularly suitable, operating the lamp with high-frequency power. Ignition voltages up to about 25 kV are necessary in order to permit the lamp to re-ignite after it has just been operated, that is, to re-ignite a "hot" lamp. To obtain such high voltages, it has previously been proposed to connect the ignition high-voltage pulse to the lamp by a high-voltage insulated cable. The insulation of such a high-voltage insulated cable is expensive and requires special provisions. In spite of substantial care and overdesign of high-voltage cables, it is still difficult, particularly under the rough operating conditions to which automotive vehicles are subjected, to provide for effective elimination of arc-over or flash-over to portions or elements of the vehicle chassis or frame; it is, also, particularly difficult to exclude all environmental effects on the cable, due for example to ambient humidity, moisture, corrosive effects due to air pollution, road salt and the like, and other environmental influences affecting the insulation efficiency of the cable.

THE INVENTION

It is an object to provide a reflector-light source combination, in which the light source is a high-pressure discharge lamp, particularly suitable for vehicular use and especially as head lamps for automotive vehicles, which is so arranged that, without requiring, essentially, additional space, the electronic circuitry and high-voltage supply are effectively protected from environmental attack, while also avoiding the possibility of flash-over or arc-over with respect to the chassis of the vehicle of conductors carrying high voltages.

Briefly, the supply circuit, typically a high-voltage, high-frequency generating circuit adapted to be coupled to the electrical supply of the vehicle which, for example, may be 12 V d-c, is located within a unitary housing, attached and secured to the back of the reflector, and sealed thereto. Preferably, a sealing compound is located between the housing and the back of the reflector to provide a seal encompassing all surfaces positioned between the housing and the back of the reflector. The high voltage connection to the lamp thus is retained within a sealed system of insulating material formed by the reflector and the housing sealed thereto.

The arrangement has the advantage that the electronic components are located in a position where space is usually available, since they can be positioned in a region where the reflector tapers in dimension with respect to the light emitting surface or lens. Thus, the housing can be fitted within, or at least approximately within, a projected outline of the reflector. The free space, usually not utilized for any other components, which is available in the vicinity of the back of the reflector is thus utilized. This space, frequently, is well shielded from ambient, environmental influences. Damaging attack by dampness, moisture, corrosion, and other environmental effects are thereby already initially removed from the housing for the electronic components. The arrangement has the additional advantage that a separate connecting cable for the high-voltage connection to fire the light source can be eliminated since the light source can be fitted directly into the housing, and connecting lines to the firing electrode thus can be integrated within the housing. The connection can be very short so that the capacitative losses are a minimum.

In accordance with a preferred feature of the invention, the housing is so constructed that the high-pressure discharge lamp is directly fitted therein with additional connecting cables between the auxiliary operating unit and the light source itself being entirely eliminated. All high-frequency losses, thus, are reduced to a minimum. External supply circuits, for example to lead to a 12 V vehicular battery, can be connected directly to the unit. The arrangement has the additional advantage that the system is effectively protected against possible shock hazards to users since all high-voltage connections are internal of the housing which is made of insulating material and preferably of plastic of sufficient dielectric strength.

DRAWINGS

DETAILED DESCRIPTION

Figure 1:
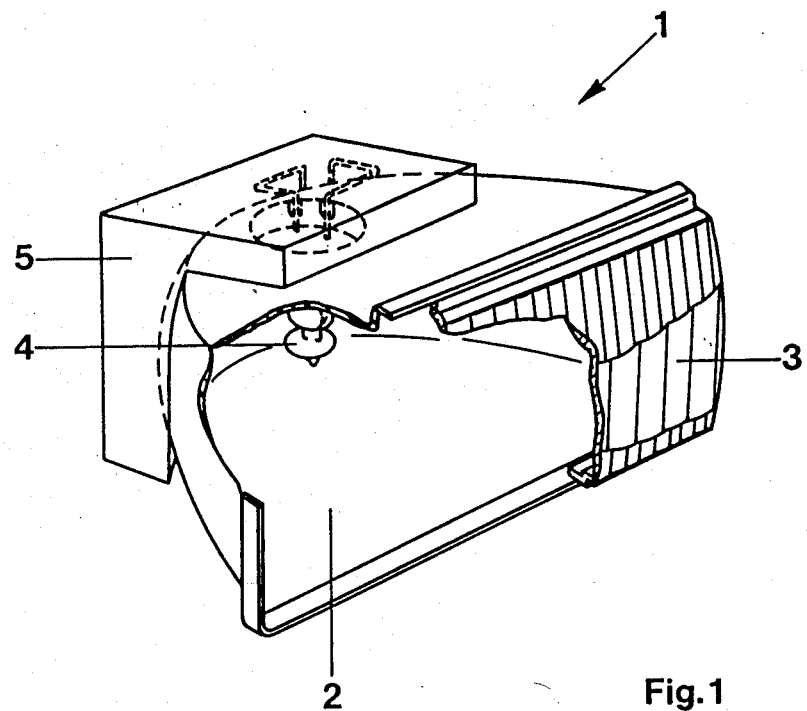
FIG. 1 is a perspective view, partly broken away, of a vehicular head light-reflector-auxiliary supply circuit combination, with a high-pressure lamp inserted from above.
Figure 2:
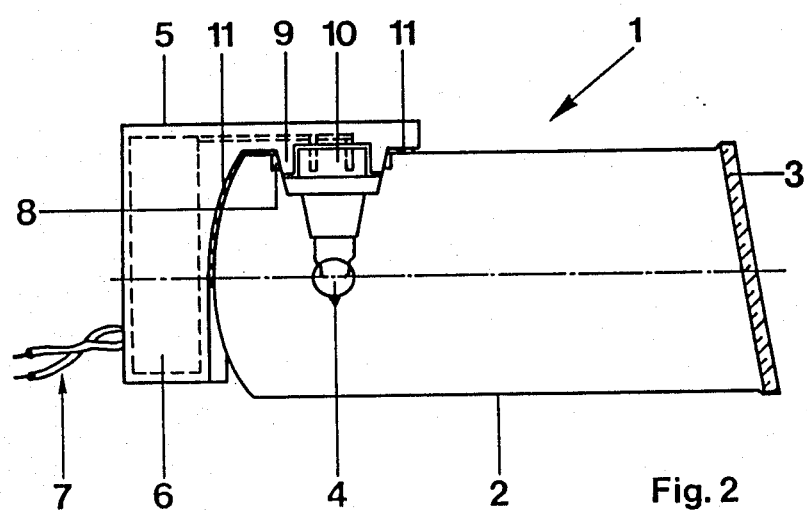
FIG. 2 is a side view, partly in section, of the arrangement of FIG. 1.

The combination unit 1 of FIGS. 1 and 2 has a reflector 2 which has a reflecting surface to reflect light outwardly from a closing lens or light distribution element 3. A single based metal halide high-pressure discharge lamp 4 is located at the foacl point of the reflector 2. A housing 5, for example of plastic, is fitted against the back side or back surface of the reflector - that is, against the surface opposite the light emitting or light reflecting surface. The housing 5 is of approximately L form and shaped to fit against the back surface of the reflector 2. The housing 5 encloses electronic ignition and operating voltage supply circuitry 6, shown only schematically in FIG. 2 in broken-line form. The circuitry 6 can be of any standard and well-known circuit configuration, and supplies electrical operating energy as well as high voltage firing pulses to the lamp 4 for starting it via a high voltage connection, as well known.

The supply to the lamp, preferably, is of high frequency, the circuitry 6 being also capable of providing high-voltage starting pulses. The electrical connection to the combination unit 1 is by a standard automotive-type connecting cable 7 (FIG. 2), supplying the circuit 6, for example, with 12 V d-c from a vehicular battery. An opening 8 is formed in the reflector 2 into which a socket 9, part of the housing 5, is fitted. The socket 9 is provided to receive the base 10 of the lamp 4. In accordance with a feature of the invention, an elastic sealing mass 11 is provided between surfaces of the housing 5 and the back surface of the reflector which are in engagement; the sealing mass 11 also seals the opening 8 against the socket 9 and adheres the housing 5 to the reflector 2.

Figure 3:
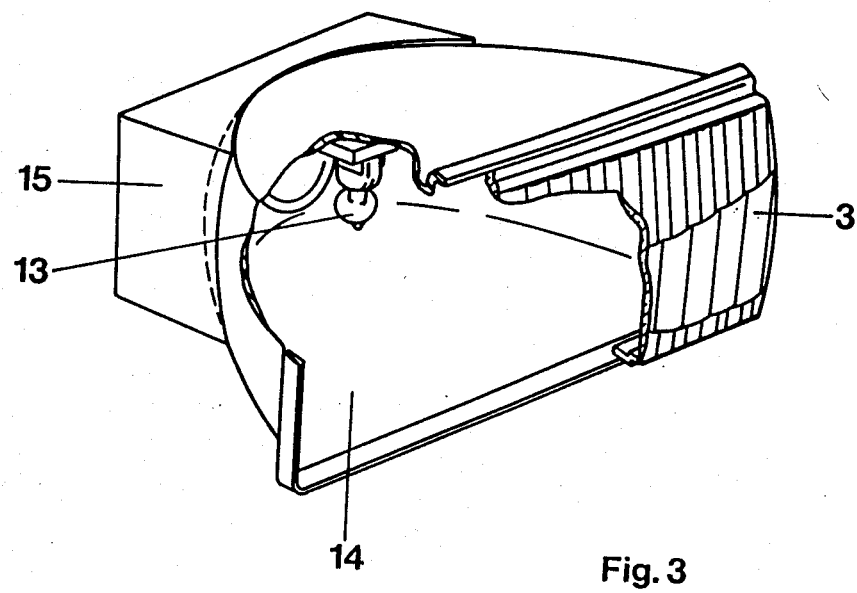
FIG. 3 is a perspective view of another embodiment of the present invention.
Figure 4:
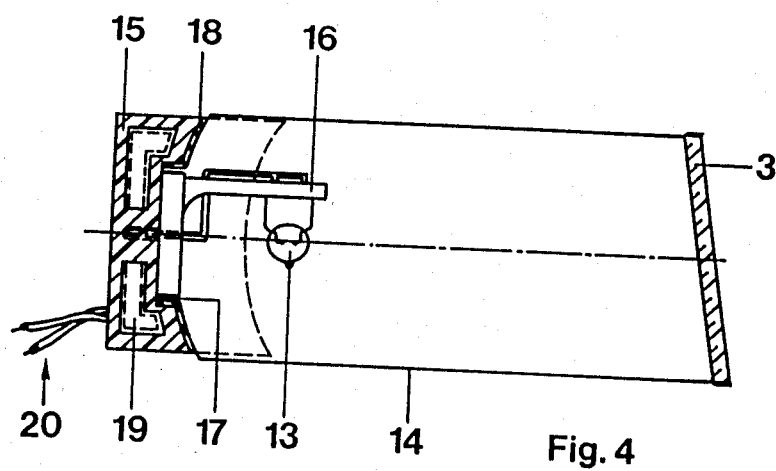
FIG. 4 is a part-sectional view of the arrangement of FIG. 3.

FIGS. 3 and 4 illustrate another embodiment, in which a housing 15 is located against the apex of the reflector. The lamp 13 is introduced into the reflector from the end surface through an opening 17 at the apex of the reflector 14. The front part of the reflector 14 is closed off with a lens or diffusion or light distribution element 3, as in the embodiment of FIG. 1. The housing 15, preferably again made of plastic, is fitted against the rearward part of the reflector 14. A holding bracket 16, secured to the housing 15, extends through the opening 17 in the apex of the reflector 14. The high-pressure discharge lamp 13 is retained on the bracket 16, to be optically accurately positioned with respect to the optical characteristics of the reflector 14. The engaging or touching surfaces of the reflector 14 and of the housing 15 are sealed by an elastic sealing mass 18, to prevent moisture, dampness, or any other foreign matter from entering the inside of the reflector 14. The electrical high-frequency supply circuit and ignition arrangement 19 is located within the housing 15, protected electrically and mechanically. Voltage supply, for example 12 V d-c, is provided by a pair of cables 20. The electrical supply from the circuit 19 to the lamp 13 is shown only schematically and can be in accordance with any well known arrangement.

Various changes and modifications may be made, and features described in connection with one of the embodiments may be used with the other, within the scope of the inventive concept.

A typical lamp, suitable for use in an automotive headlight is a low-wattage mercury metal halide high-pressure discharge lamp with an arc length of approximately 5 mm or less. A suitable elastic sealing compound 11, 18 is a silicone rubber adhesive sealant, for example as sold by General Electric Company under the notation RTV 108.

Typically, the reflector 2, 14 is made of plastic, although it may be made of glass or metal. When a metal reflector is used, the material of the respective housings 5, 15 must be of sufficient dielectric strength also on the surfaces facing the reflector to withstand the ignition pulse voltages. Suitable materials for the housings 5, 15 are thermoplastic materials with sufficient thermal endurance, for example Polyamide 6.

I claim:

1. Vehicular reflector-light source and supply circuit combination unit having a reflector (2, 14) having a reflecting surface and a back surface;

a high-pressure discharge lamp (4, 13) requiring high voltage starting pulses located within the reflector opposite the reflecting surface thereof; and a supply circuit unit (6, 19) including a high voltage connection electrically connected to the high-pressure discharge lamp, comprising, in accordance with the invention, a unitary, sealed housing (5, 15) of insulating material immediately and directly located against the reflector at the back surface thereof, and and retaining said supply circuit within said housing, the discharge lamp (4, 13) being secured and fitted to the supply circuit (6, 19) including said high voltage connection; and adhesive sealing means (11, 18) continuously sealing and adhering contiguous surfaces between the reflector (2, 14) and the housing (5, 15) to retain said high voltage connection within a sealed system defined by the housing sealed and adhered to the reflector.

2. The unit of claim 1, wherein the reflector is made of non-conductive material.

3. The unit of claim 2, wherein the housing is made of plastic.

4. The unit of claim 3, wherein the high-pressure discharge lamp (4, 13) is directly secured and fitted to the supply circuit (6, 19) retained within said housing.

5. The unit of claim 1, wherein the reflector is made of plastic.

6. The unit of claim 1 wherein both the reflector (2, 14) and the housing (5, 15) are made of plastic.

7. The unit of claim 6, wherein the high-pressure discharge lamp (4, 13) is directly secured and fitted to the supply circuit (6, 19) retained within said housing.

8. The circuit of claim 1, wherein the housing (5, 15) is made of plastic material.

9. The unit of claim 1, wherein the reflector is formed with an end apex portion, and the back surface, in the region of the apex, defines a profiled configuration; and wherein the housing (5, 15) is shaped to fit said profiled configuration.

10. The unit of claim 1 wherein (FIGS. 1, 2) the housing is of at least approximately L form, having one leg fitted against the apex of the reflector and another leg overlapping a portion of the reflector adjacent the apex thereof.

11. The unit of claim 1, wherein (FIGS. 3, 4) the housing is of essentially box shape and fitted against the apex of the reflector.

12. The unit of claim 9, wherein the reflector is made of non-conductive material.

13. The unit of claim 12, wherein the reflector is made of plastic.

14. The unit of claim 12, wherein the housing is made of plastic.

15. The unit of claim 9, wherein the housing is made of plastic.

16. The unit of claim 11, wherein the housing is made of plastic.

17. The unit of claim 11, wherein the reflector is made of non-conductive material.

18. The unit of claim 17, wherein the reflector is made of plastic.

19. The unit of claim 17, wherein the housing is made of plastic.

* * * * *